United States Patent [19]

Fellnor et al.

[11] 4,133,635
[45] Jan. 9, 1979

[54] METHOD AND APPARATUS FOR DRYING AND PREHEATING SMALL METALLIC PARTICLES

[75] Inventors: John R. Fellnor, Burlington, N.J.; William J. Love, Jr., Perkasie, Pa.

[73] Assignee: Combustion Engineering, Inc., Stamford, Conn.

[21] Appl. No.: 766,489

[22] Filed: Feb. 7, 1977

[51] Int. Cl.$^2$ .............................................. F27D 7/00
[52] U.S. Cl. ....................................... 432/19; 75/44 R; 100/38; 100/92; 264/111; 432/72
[58] Field of Search ....................... 432/19, 72; 100/38, 100/92; 264/111; 75/44 R

[56] References Cited

U.S. PATENT DOCUMENTS

| | | | |
|---|---|---|---|
| 1,303,799 | 5/1919 | Jarvis | 75/44 |
| 3,306,237 | 2/1967 | Ransom, Jr. | 432/72 |
| 3,450,529 | 6/1969 | MacDonald | 100/38 |
| 3,616,515 | 11/1971 | Moore | 432/72 |
| 3,619,908 | 11/1971 | Kallas | 432/72 |
| 3,656,735 | 4/1972 | Eliot | 100/92 |
| 3,739,488 | 6/1973 | Khan | 34/95 |
| 3,817,697 | 6/1974 | Parobek | 432/72 |
| 3,960,069 | 6/1976 | Bowyer | 100/38 |

Primary Examiner—John J. Camby
Attorney, Agent, or Firm—Duffield & Lehrer

[57] ABSTRACT

A system for drying and preheating small metallic particles such as chips, turnings, borings and the like to remove volatiles therefrom which includes a dryer working in conjunction with a briquetting press. The dryer includes a drying and preliminary combustion chamber including a revolving drum therein through which the chips pass. The drying and preliminary combustion is heated and is atmospherically sealed and operated with a reducing atmosphere. The volatiles driven from the metallic particles are passed to a combustion completion chamber which is maintained at a temperature sufficient to burn the combustibles and into which air is injected to complete the combustion. The hot metallic particles are thermally insulated and sealed from the atmosphere while being conveyed from the drying and preliminary combustion chamber to the briquetting press where they are compressed into briquettes for subsequent introduction into induction furnaces and the like.

57 Claims, 7 Drawing Figures

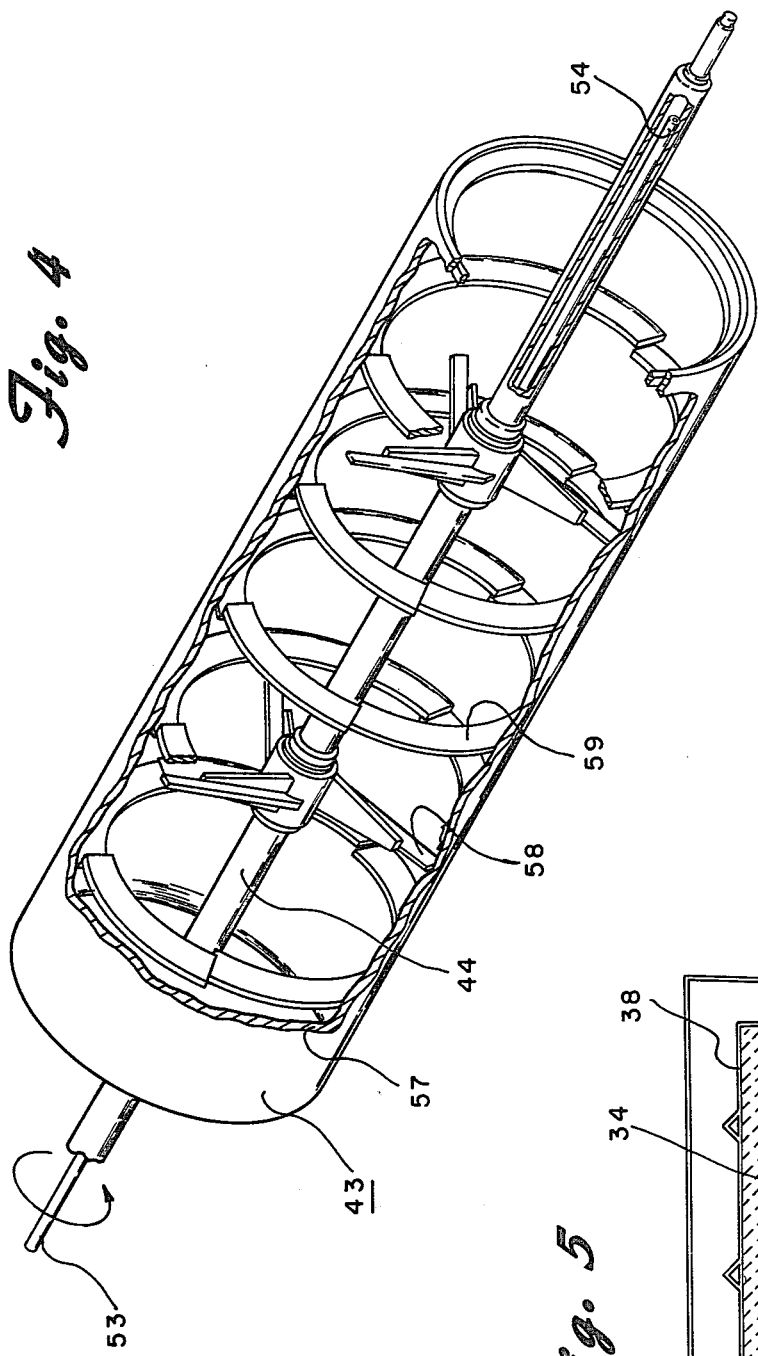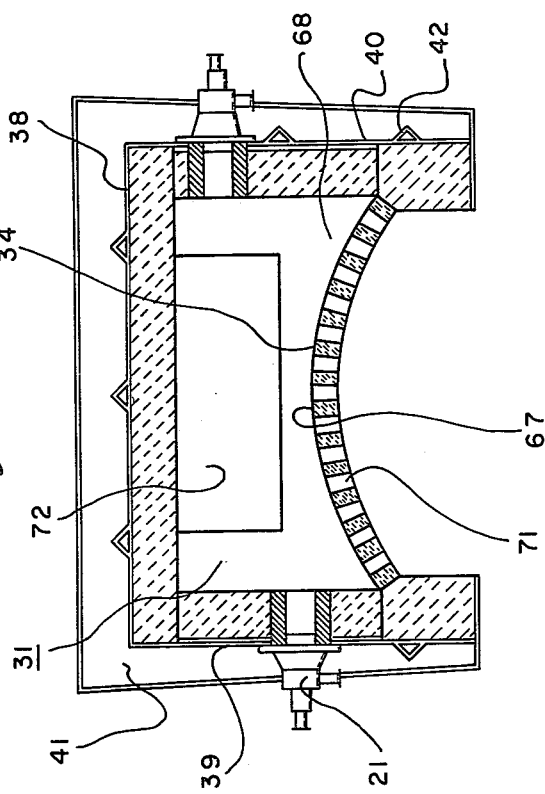

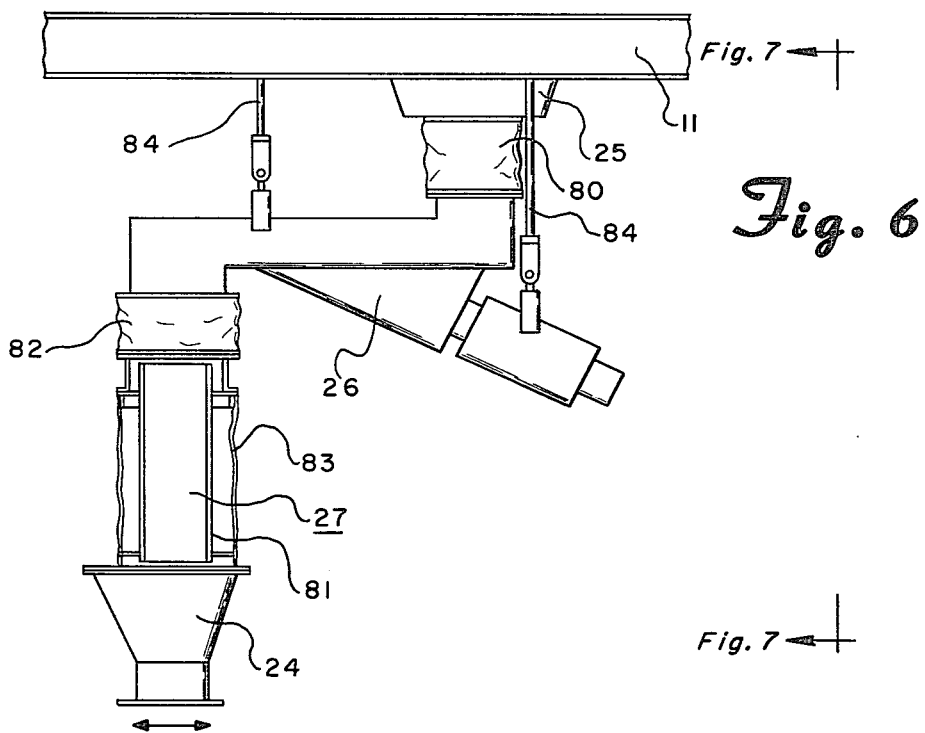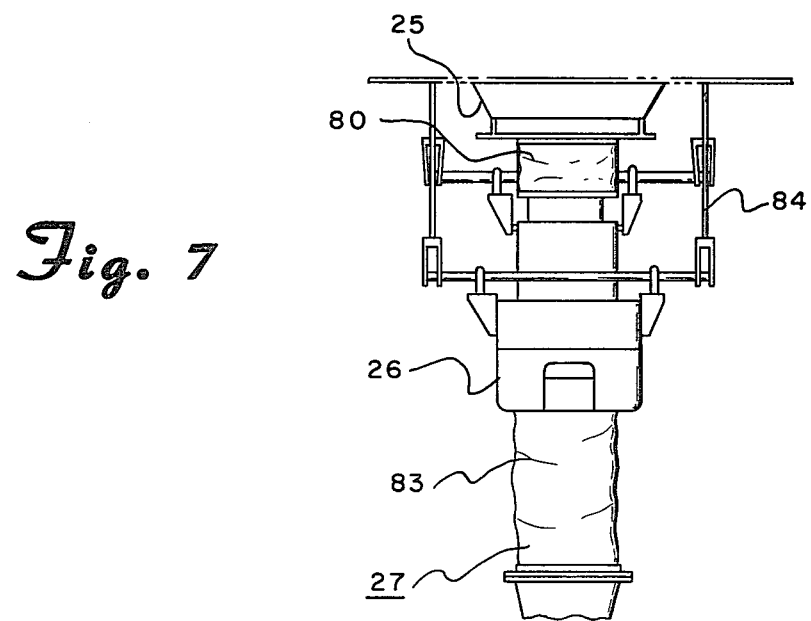

METHOD AND APPARATUS FOR DRYING AND PREHEATING SMALL METALLIC PARTICLES

BACKGROUND OF INVENTION

Industries such as foundries, automotive plants and any other industry in which metal castings and other parts are machined create enormous quantities of scrap material. For example, the machining of engine blocks, which are essentially cast iron, will result in a significant percentage of the engine block weight being machined off in the form of cast iron borings which are very fine metallic particles. The machining of steel parts likewise will result in steel chips and turnings which, although somewhat larger than the cast iron borings, are still relatively small.

During the machining operations, various cutting fluids will normally be used. These fluids may range from straight hydrocarbon or oil type cutting fluids to water base cutting fluids with water soluble oils therein. In a typical situation, the borings and turnings will include, by weight, from 2 to 6 percent of the cutting oil.

Recovery of the scrap borings, turnings and chips is desirable in view of the cost of basic materials. Nevertheless, recovery of these materials is expensive and difficult due to the nature of the borings and turnings. The loose nature of the borings and turnings makes them extremely difficult to handle. Additionally, it is inefficient to directly deposit the borings and turnings in a furnace or cupola inasmuch as they will float in the slag of an induction furnace or blow out the stack of a cupola and very little actual metal recovery will occur. Further, the high moisture and hydrocarbon content in the material creates a dangerous situation of moisture expansion or explosion within the furnace and also the hydrocarbon will create contamination and excessive smoking. Accordingly, direct introduction of the material is, for all practical purposes, nearly impossible.

The scrap recovery industry is currently utilizing large briquetting presses for compacting the borings and turnings into briquettes. In this operation, the material is fed cold to a briquetting press which will produce a compressed briquette ranging from a few pounds to more than 125 pounds per briquette. These cold briquettes, while a substantial improvement over the unprocessed material, do nonetheless have considerable problems. Cold briquetting does not remove the moisture or other hydrocarbons except to the extent that they are squeezed from the material during compression into a briquette. Nonetheless, there is still a considerably high percentage of moisture and hydrocarbon remaining in the finished cold briquette.

This moisture and hydrocarbon content of the cold briquette still presents considerable problems as respects the introduction of the briquette into furnaces or cupolas. The briquettes are somewhat successfully used in cupolas but they have not been successfully used in induction furnaces due to the danger of explosion within the rather narrow confines of the induction furnace. Additionally, the density of the briquette is not sufficiently high to prevent floating of the briquettes, to some degree in the molten bath. Accordingly, there is a significant weight loss of the material in the furnace by reason of entrainment in the slag and loss in the furnace gases. Additionally, the hydrocarbons present within the cold briquette cause considerable smoking and other contamination within the furnace.

The cold briquettes also suffer a severe problem of structural integrity. Notwithstanding the enormous pressures utilized in forming the briquette, the moisture and oil within the briquette as well as the fact that it was compressed cold tend to prevent the compressed particles from strongly adhering to one another. The structural integrity of the briquette is of greatest concern in transporting of the material. Very often the scrap material is collected by a scrap dealer who will transport the material to his base of operation at which the material is briquetted. The briquettes then are returned by means of truck or the like to the plant where they are to be remelted. This means that the briquettes must be loaded at the dealer's plant, transported by means of truck or the like and then ultimately unloaded and fed to the cupola or furnace. During these operations, a very substantial portion of the briquettes break up or crumble back to the loose borings and chips. This is especially true of cast iron borings which have been briquetted. The end result of this is that a substantial portion of the material cannot be used in the melting facility and must then be returned back to the dealer for rebriquetting. The effect of this is duplication of hauling expenses all of which distracts from the value of the briquette.

Various attempts have been made in the industry to overcome the foregoing problems by removing the moisture and hydrocarbons from the material prior to briquetting. Washers and dryers have been attempted. The washers will basically dissolve the hydrocarbon leaving the chips somewhat free of the hydrocarbons but still heavy with moisture. The wet material is then dried. The dryers heretofore used are essentially of the type which do not attempt to control the atmosphere within the dryer and use indirect heat or direct flames upon the material. In either case, the presence of oxygen in the dryer in conjunction with the elevated temperatures of the dryer results in oxidation of the material. Additionally, there is substantial carbon and silicon loss in the heated material. The dired material is briquetted in the normal fashion. However, the loss of carbon and silicon in the material and the presence of iron oxide seriously distracts from the value of the resultant briquette.

The washer and dryer combinations heretofore known also suffer from the problem of excessive smoke generation or pollution. The hydrocarbons, to the extent that they are not burned in the dryer, are permitted to escape to the atmosphere which creates serious problems of industrial pollution which is of great consequence in current times.

OBJECTS OF INVENTION

It is an object of the present invention to provide a system which includes apparatus and methods for drying and preheating small metallic particles such as chips, turnings, borings, and the like to remove volatiles therefrom including moisture and hydrocarbons and hot briquetting of the particles without significant oxidation and loss of carbon and silicon in the resultant briquette.

It is a further object of the present invention to provide a system including apparatus and methods for drying and preheating small metallic particles in a manner that complete combustion of all hydrocarbons is achieved to reduce pollution and contamination.

It is yet a further object of the present invention to provide apparatus and methods for drying and preheating small metallic particles such as chips, turnings, borings, and the like for ultimate forming into a briquette in which the carbon content of the resultant briquette may be increased by reason of the process within the apparatus and, if desired, alloying material added to the briquette through the process.

SUMMARY OF INVENTION

The overall system of the present invention includes a dryer operating in conjunction with a briquetting press. The dryer is essentially composed of two major sections, the first and lower section being a drying and preliminary combustion chamber and the upper section consisting of a combustion completion chamber.

The drying and preliminary combustion chamber includes therein a cylindrical elongate drum which is journaled upon a drum shaft secured in journals at either end of the drying and preliminary combustion chamber.

The material to be dried is stored in a feed hopper and is conveyed from the feed hopper to a screw feed conveyor. The discharge end of the screw feed conveyor deposits the material into the upper end of the drying drum. Rotation of the drum permits the material to be mixed and moved downwardly through the drum to a discharge hopper at the opposite end of the drying and preliminary combustion chamber.

A plurality of burners are positioned in the drying and preliminary combustion chamber. The burners are operated to generate heat within the chamber but of a reducing atmosphere. The volatiles on the chips are driven off and the hydrocarbon heavy effluent permitted to pass from the drying and preliminary combustion chamber to a combustion completion chamber. During this stage of the process, the reducing atmosphere will increase the carbon level in the material. Additionally, alloying material may be intermixed with the turnings and borings to provide an alloy mix in the metallic particles.

The combustion completion chamber includes a common chamber divider wall with the drying and preliminary combustion chamber in which there are positioned effluent entry ports which permit the hydrocarbon heavy effluent to enter the combustion completion chamber. The combustion completion chamber is an elongate chamber which includes a mixing section and an expansion and settling section which terminates and discharges to a chimney.

A plurality of preheat and pilot burners and air injectors are positioned within the mixing section of the combustion completion chamber. The preheat and pilot burners are operated to maintain a minimum low temperature in the combustion completion chamber and the air injectors are operated, as necessary, to inject sufficient oxygen to the combustion completion chamber to burn all of the hydrocarbons in the effluent. Particulate matter will settle in the expansion and settling chamber as the effluent moves through the chamber to the chimney. A damper is utilized in the chimney to regulate the negative pressure or draft within the system.

The resultant heated particles are conveyed through an atmospherically sealed and thermally insulated conveying system from the discharge hopper to the feed hopper of the briquetting press. In this manner, cooling and oxidation of the particles is prevented. The dried, hydrocarbon free hot particles are compressed into briquettes at the briquetting press.

DESCRIPTION OF DRAWINGS

FIG. 4 is a perspective view partially cut away showing the details of the dryer drum of the present invention;

FIG. 5 is an end sectional view of the upper combustion completion of the dryer of the present invention;

FIG. 6 is a detail side elevation view of the discharge hopper, metering conveyor and feed hopper arrangement for the briquetting press in accordance with the present invention; and FIG. 7 is a right end view of the assembly of FIG. 6.

DETAILED DESCRIPTION OF INVENTION

I. System Structure

Figure 2:
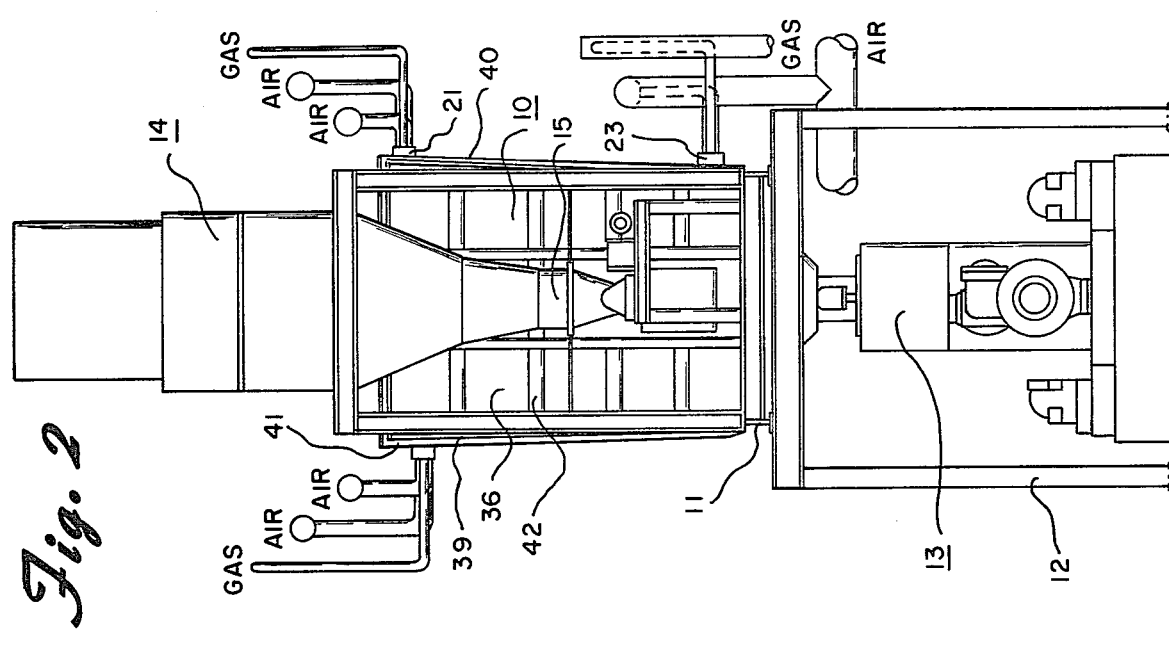
FIG. 2 is a left end view of the dryer and briquetting press according to the invention viewed from FIG. 1.
Figure 1:
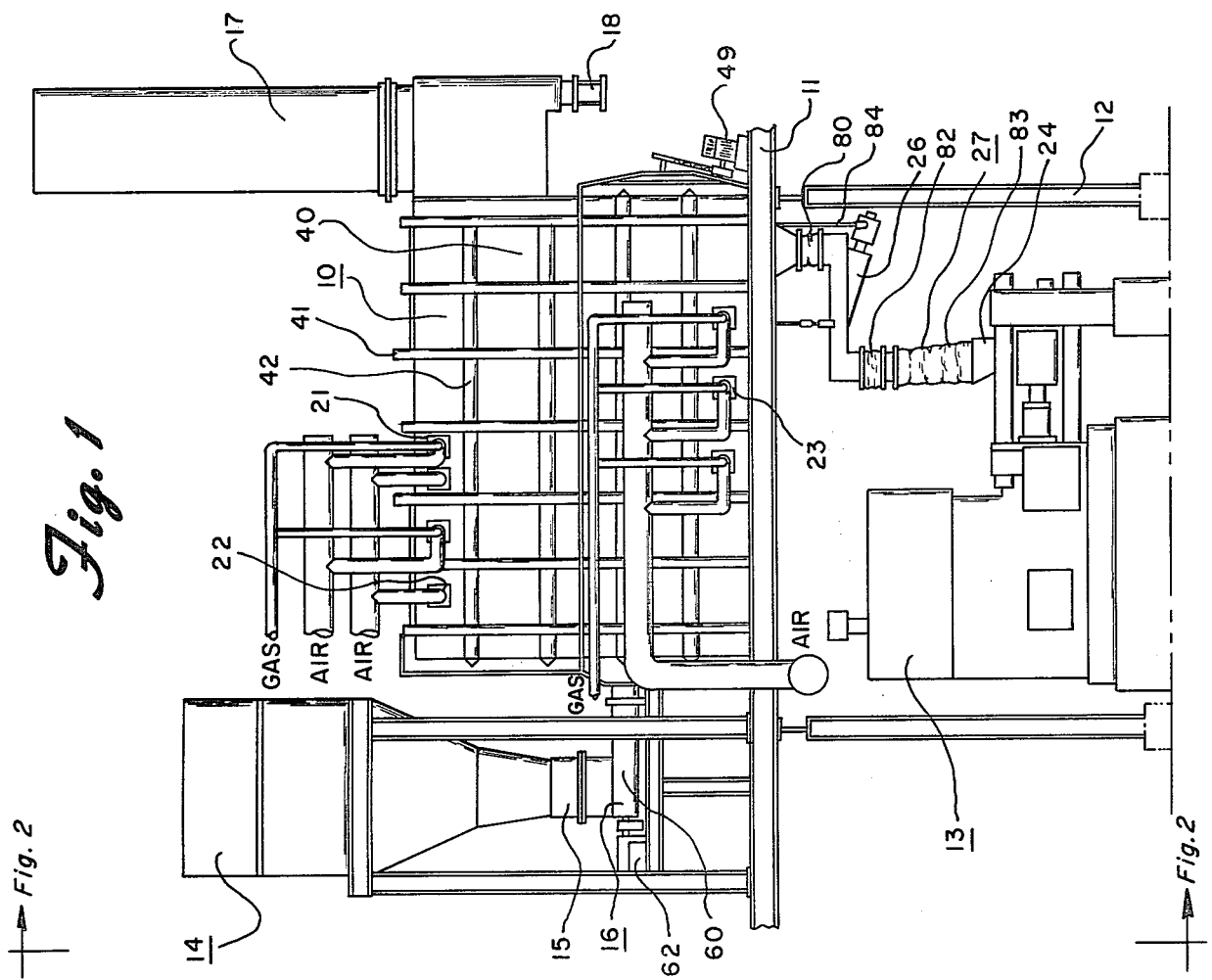
FIG. 1 is a side elevation view of the dryer and associated briquetting press according to the present invention.

The overall system of the present invention is shown in FIGS. 1 and 2 of the drawings. The system includes a dryer assembly 10 supported upon appropriate I beams 11 and columns 12 above a briquetting press 13. A feed hopper 14 is positioned at one end of the dryer assembly 10 and contains the metallic particles to be dried. A feed chute 15 is positioned at the lower end of the feed hopper 14 and conveys the material to the screw conveyor 16 to be described in more detail hereinafter.

The dryer assembly 10 includes, at the opposite end thereof, a chimney 17. The chimney, at the lowermost portion thereof, further utilizes a damper 18 as will also be described in more detail hereinafter.

The upper portion of the dryer assembly 10 includes a plurality of preheater and pilot burners 21 and air injectors 22 which are appropriately interconnected to gas and air manifolds as indicated in FIG. 1 for operation of the respective devices. Additionally, a plurality of secondary burners 23 are positioned in the lower most portion of the dryer assembly 10. These secondary burners are likewise appropriately interconnected to gas and air manifolds for their operation as further shown in FIG. 1.

Referring further to FIG. 1, the briquetting press 13 includes a feed hopper 24. The discharge hopper 25 of the dryer assembly 10 is interconnected to the feed hopper 24 by means of a metering conveyor 26 and a discharge chute assembly 27 as will all be described in more detail hereinafter.

Figure 3:
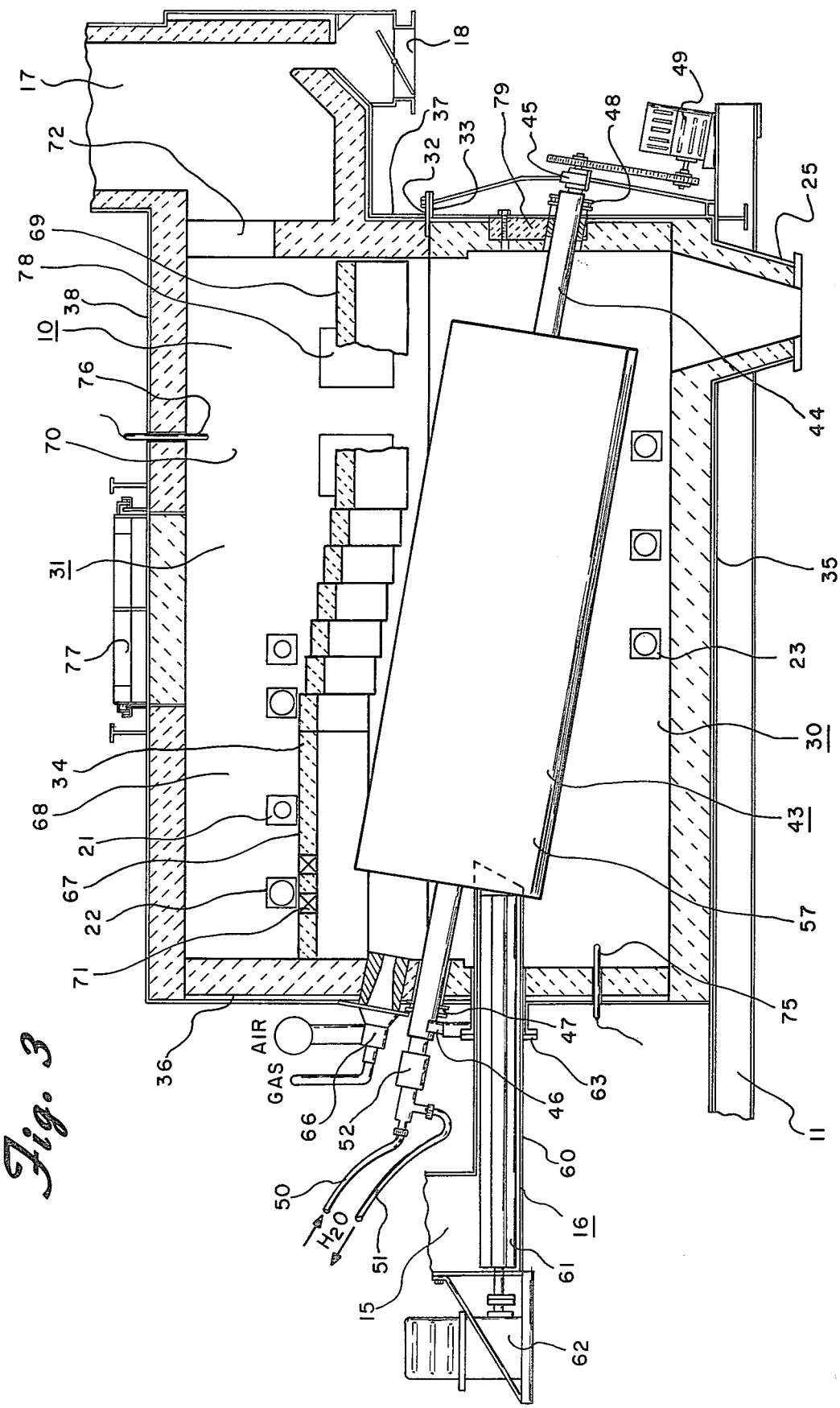
FIG. 3 is a sectional view through the dryer assembly of the present invention.

Referring now to FIG. 3, the details of the dryer assembly are shown. The dryer assembly includes a drying and preliminary combustion chamber 30 in the lower portion thereof and an elongate combustion completion chamber 31 superimposed on top of the drying and preliminary combustion chamber 30. The two chambers are joined together by means of corresponding cooperating flanges 32 and 33 on the combustion completion chamber 31 and drying and preliminary combustion chamber 30 respectively. The flanges 32 and 33 provide a common parting line for the chambers permitting their assembly and disassembly.

The combustion completion chamber 31 includes, in the bottom portion thereof, as may be seen in FIGS. 3 and 5, an arched chamber divider wall 34. The chamber divider wall 34 is formed of a suitable refractory material such as fire brick. The chamber divider wall 34 serves to define the drying and preliminary combustion chamber 30 and the combustion completion chamber 31.

The interior walls of both of the drying and preliminary combustion chamber 30 completion chamber 31 are lined with a refractory material such as fire brick as illustrated in FIGS. 3 and 5. The fire brick is held in place by means of exterior metal casing walls. The casing walls include the bottom casing wall 35, top casing wall 38, end casing walls 36 and 37 and side casing walls 39 and 40 as shown in FIGS. 1–3. All of the casing walls are likewise secured in place by means of vertical and horizontal supporting members 41 and 42 respectively.

Returning now to FIG. 3, the drying and preliminary combustion chamber 30 includes therein a drying drum assembly 43. The drum assembly 43 is journaled for rotation within the drying and preliminary combustion chamber 30 by means of a drum shaft 44. The drum shaft 44 is journaled at the right end by means of a shaft bearing 45 and on the left end a pair of shaft rollers 46. Atmospheric seals 47 and 48 are employed at either end of the drum shaft to seal the shaft from entrance by air from outside of the drying and preliminary combustion chamber for purposes to be hereinafter described.

The drum shaft and associated drum are rotated within the drying and preliminary combustion chamber by means of a variable speed drive motor 49 operating through a drive chain and sprocket arrangement as illustrated in FIG. 3. The drum shaft 44 is water cooled by means of inlet and outlet water lines 50 and 51 respectively operating through a rotating coupling 52 as may further be seen in FIG. 4.

Turning to FIG. 4, the internal details of the drying drum assembly 43 are shown. The drum shaft 44 is a hollow shaft and includes a smaller internal cooling line 53 positioned concentrically within the hollow drum shaft 44. The cooling line receives water from the rotating coupling 52 and passes the water to the opposite end of the hollow drum shaft 44. The water discharging from the discharge end 54 of the cooling line 53 returns back through the hollow shaft 44 to the rotating coupling 52 and in this manner cools the drum shaft.

The drying drum assembly 43 includes a drum shell 57 which is of length substantially the length of the drying and preliminary combustion chamber 30. The drum shell 57 is supported concentrically about the drum shaft 44 by means of a plurality of drum spokes 58 positioned longitudinally along the drum shaft 44. The drum spokes 58 are welded to the drum shell 57 at their outer ends and to the drum shaft 44 at their inner ends. The inner ends of the drum spokes 58 are welded tangentially to the drum shaft 44. This tangential securing arrangement compensates for radial expansion of the drum shaft 44 in a manner to prevent undue radial thrust upon the drum spokes and drum shell.

The drying drum assembly includes a plurality of arcuate segments 59 which form a convolution within the drum. In the embodiment shown in FIG. 4, five such convolutions are shown each made of four arcuate segments.

The ends of each arcuate segment in a given convolution overlap the ends of its next adjacent segment. Additionally, the arcuate segments are inclined to the longitudinal axis of the drum to establish spacing between the ends of adjacent segments. The angle of the inclination of the arcuate segments is at a reverse lead angle to the direction of drum rotation as indicated by the arrow in FIG. 4. The metallic particles deposited into the drum will be thoroughly mixed and exposed to the atmosphere within the drum inasmuch as they cannot pass through the drum quickly due to the reverse lead angle of the segments. The particles will move from convolution to convolution by passing between the spacing between the ends of the adjacent segments. The foregoing structure is intended to assure thorough mixing of the metallic particles within the drum and also to extend the time required for passage of the particles through the drum.

The drum shell 57, drum spokes 58 and drum shaft 54 may be of any suitable material. In a preferred embodiment, the drum shell and spokes will be made of a high temperature resistant material such as stainless steel and also a material which has high wear resistance.

Returning now to FIG. 3, the metallic particles are fed to the drying drum assembly 43 by means of a screw conveyor 16. The screw conveyor 16 includes a screw feeder casing 60 and a screw feeder 61 positioned within the screw feeder casing. A variable speed drive motor 62 operates to drive the screw feeder 61.

The screw feeder casing 60 passes through the casing wall 36 of the drying and preliminary combustion chamber 30 and extends generally into the upper open end of the drying drum assembly 43. An atmospheric casing seal 63 surrounds the screw feeder casing 60 and is likewise secured to the casing wall 36 in a manner to atmospherically seal the screw feeder casing with the casing wall 36.

The screw feeder 61 has an increasing lead angle in the direction of the drying drum assembly. This design is intended to permit a large quantity of metallic particles in the feed chute 15 to rest upon the screw feeder 61 so as to atmospherically seal the feed chute 15 from the drying and preliminary combustion chamber 30 while the increased lead angle will quickly remove the materials from the high density area into the drying drum assembly without undue compaction of the material.

The drying and preliminary combustion chamber 30 includes therein a plurality of secondary burners 23 and at least one primary burner 66. The secondary burners 23 are appropriately plumbed with air and gas manifolds as shown in FIG. 1. The secondary burners are positioned generally in the bottom portion of the drying and preliminary combustion chamber 30. However, the burners are inclined upwardly toward the drying drum assembly 43 so that their products of combustion will strike the drying drum assembly 43 tangentially of the drum along the lower longitudinally extremity.

The primary burner 66 is positioned in the end casing wall 36 in line with and above the drum shaft 44. The burner extends just slightly past the inside portion of the refractory material positioned on the end wall casing 36 and the products of combustion are directed downwardly into the upper end of the drying drum assembly 43. The primary burner 66 is appropriately plumbed with gas and air manifolds as shown in FIG. 3. The operation of the primary burner 66 will be described in more detail hereinafter.

Further referring to FIG. 3, attention will now be directed to the combustion completion chamber 31. The chamber divider wall 34 forming the bottom portion of the combustion completion chamber 31 has a relatively horizontal extending portion 67 which forms a mixing section 68 in the combustion completion chamber. Beyond the horizontal portion 67, the refractory material is stepped down for a portion of the longitudinal distance of the combustion completion chamber to a second horizontal portion 69 to define an expansion and settling section 70 within the combustion completion chamber.

As may be seen in FIGS. 3 and 5, the horizontal portion 67 of the chamber divider well 34 includes therein a plurality of effluent entry ports 71 which are postioned above the upper end of the drying drum assembly 43. At the opposite end of the combustion completion chamber and at the end of the second horizontal portion 69 of the chamber divider wall 34, the combustion completion chamber includes an effluent restriction discharge port 72 formed in the end wall casing 37 of the dryer assembly. The effluent restriction discharge port 72 represents a restriction of approximately one half the cross-sectional area of the expansion and settling section of the combustion completion chamber and presents a flow restriction to the combustion completion chamber for the purpose to be hereinafter described.

A combustion completion chamber chimney 17 is disposed at the end of the combustion completion chamber 31 in communication with the effluent restriction. discharge port 72 as shown in FIG. 3. The combustion completion chamber chimney 17 provides the negative pressure or draft and vent for the resultant burned gases as hereinafter described.

A negative pressure control damper 18 is positioned in the bottom portion of the combustion completion chamber chimney 17. The damper may be of the barometric type or of the motor driven type. In the embodiment wherein the damper is of the motor driven type, a pressure monitoring device (not shown) is positioned within the combustion completion chamber 31 and operates through servocontrols (not shown) to control the motor driven damper to maintain the negative pressure within the combustion completion chamber at a predetermined level.

The combustion completion chamber in the mixing section 68 thereof includes a plurality of preheat and pilot burners 21 and a plurality of high velocity air injectors 22. As may be more specifically seen in FIG. 5, and in the embodiment shown, there are four preheat and pilot burners 21 and four high velocity air injectors 22 utilized. Two of the preheat and pilot burners and two high velocity air injectors are positioned on one side of the combustion completion chamber at a low point adjacent the chamber divider wall 34 whereas the other two preheating pilot burners 21 and two high velocity air injectors 22 are positioned at a high point in the combustion completion chamber adjacent the upper wall of the chamber. In this manner, the products of combustion from the preheat and pilot burners are more significantly the air jets injected from the air injectors 22 create a transverse vortices within the mixing section 68 of the combustion completion chamber 30 to aid in mixing and completing combustion of the hydrocarbon rich effluent passing into the combustion completion chamber through the effluent entry ports 71.

A temperature sensing probe 75 is positioned within the drying and preliminary combustion chamber 30. In a like manner, a similar temperature sensing probe 76 is positioned within the combustion completion chamber 31. The temperature sensing probes 75 and 76 operate through servocontrollers (not shown) which control the secondary burners 23 and preheat and pilot burners 21 and high velocity air injectors 22 within their respective chambers to maintain temperature control as hereinafter described.

The combustion completion chamber 31 further includes an inspection hatch 77 in the upper casing wall 38. This inspection hatch 77 is provided in order that access may be had to the combustion completion chamber. Additionally, two clean out ports 78 are positioned on each side of the combustion completion chamber at a level adjacent the second horizontal portion 69 of the combustion completion chamber and on each side thereof. These clean out ports are used to withdraw particulate matter which has settled in the expansion and settling section 70 of the combustion completion chamber.

The upper end of the drum shaft 44 of the drying drum assembly 43 is positioned on shaft rollers 46 as heretofore described at the parting line between the flanges 32 and 33 for the combustion completion chamber and the drying and preliminary combustion chamber. The opposite end of the shaft is journaled in shaft bearing 45 as heretofore described. Additionally, a drum removal plug 79 is positioned immediately above the shaft seal 48. The drum removal plug includes a plurality of threaded fasteners which hold the plug in place and permit the plug to be withdrawn from the end casing of the chamber. In this manner, once the combustion completion chamber has been separated from the drying and preliminary combustion chamber and the drum removal plug likewise removed, the entire drying drum assembly may be withdrawn upwardly out of the drying and preliminary combustion chamber.

Referring to FIG. 3, the preheated and dryed metallic particles are discharged from the lower end of the drying drum assembly and pass into a discharge hopper 25. As best seen in FIGS. 6 and 7, the discharge hopper feeds its output into a vibratory metering conveyor 26 supported by suspension bars 84 which, in turn, discharges into a discharge chute assembly 27 that deposits the metallic particles into the press feed hopper 24.

The discharge hopper 25 is thermally insulated to prevent cooling of the metallic particles. Additionally, the discharge hopper includes an atmospheric seal in form of an asbestos sleeve 80 interconnected between the bottom of the discharge hopper 25 and the upper portion of the vibratory metering conveyor 26. This flexible sleeve 80 also provides the flexible interconnection between the discharge hopper and the vibratory metering conveyor which is horizontally oscillating in its operation.

The vibratory meter conveyor, as described in more detail hereinafter, is also thermally insulated and atmospherically sealed. The metering conveyor may be periodically operated as necessary to maintain the proper level of material in the press feed hopper 24.

The vibratory metering conveyor 26 further includes a discharge chute sleeve 81 which extends to the press feed hopper 24. An upper flexible sleeve 82 is provided to atmospherically seal and thermally insulate the upper portion of the discharge chute sleeve 81. Additionally, a lower flexible sleeve 83 is provided and surrounds the lower portion of the discharge chute sleeve 81 to atmospherically seal and thermally insulate the discharge chute sleeve. The lower portion of the lower flexible sleeve seal 83 is connected to the upper portion of the press feed hopper 24 to complete the atmospheric seal with the press feed hopper. The hopper flexible sleeve 82, and more particularly, the lower flexible sleeve 83 permit relative movement between the movable press feed hopper 24 and the relatively stationary discharge chute 81. This relative movement is necessary to accommodate briquetting presses of design in which the press feed hopper 24 shuttles between feed and discharge positions during the press operation.

Material level sensing probes (not shown) may be installed in the press feed hopper 24. One form of probe which may be used is an electric conductivity probe. The probes will be placed at a high point and a low point in the feed hopper. As the press consumes the metallic particles, the material in the feed hopper will reach the low probe which will sense a lack of conductivity and, in response, operate the vibratory metering conveyor. Once the metering conveyor has delivered sufficient material to fill the press feed hopper to the high conductivity probe, conductivity at that point will be sensed and the metering conveyor operation discontinued.

II. System Operation

Start up of the system includes starting the drum drive but not the screw feed conveyor. The secondary burners 23 and primary burners 66 are ignited in the drying and preliminary combustion chamber. Additionally, the preheat and pilot burners 21 are ignited.

The temperature controls for the drying and preliminary combustion chamber and the combustion completion chamber are set to the required temperature range which depends upon the condition of the material to be dried and also the type of material. The temperature span which may be achieved in the drying and preliminary combustion chamber 30 is from between 800 degrees Fahrenheit to 1400 degrees Fahrenheit. Where the metallic particles are steel or lower melting point materials such as aluminum and brass, the temperature controller will be set for the 800 degrees Fahrenheit level. In the case of materials such as cast iron, the upper range of approximately 1400 F would be chosen. However, any temperature between the controller extremes may be utilized based upon experience, the condition of the material and the type of material as necessary to completely remove the moisture and hydrocarbon from the material without oxidizing the material.

In a like manner, the temperature controls for the combustion completion chamber will be set based upon the condition of the materal, i.e. the amount of moisture and particularly the type and amount of hydrocarbon expected to be present in the effluent. In drying normal material, the low set point for the combustion completion chamber will be set for approximately 1200 to 1400 degrees Fahrenheit which is a stand by or idle temperature.

Once the preset temperatures have been achieved in the drying and preliminary combustion chamber and the combustion completion chamber, the screw conveyor 16 will then be operated to deliver material to the drying drum assembly 43.

The amount of hydrocarbon and type of hydrocarbon present in the material to be dried will dictate the air to fuel ratio at which the primary burner 66 and secondary burners 23 will be operated. If the material being dried is low in hydrocarbon, then there will be less combustible material present in the drying and preliminary combustion chamber and accordingly, the secondary burners and primary burner will be throttled for close to stoichiometric operation which will be necessary to maintain the required heat input to the drying and preliminary combustion chamber and also to maintain a low oxygen presence within the chamber to prevent oxidation of the material. On the other hand, if the material being dried is high in hydrocarbon, then the air to fuel ratio for the secondary and primary burners will be throttled for a high oxygen rich flame. However, the excess oxygen is quickly consumed by the additional hydrocarbon which acts as fuel for the process with the overall result that the atmosphere within the drying and preliminary combustion chamber is, nevertheless, a reducing atmosphere. The amount of excess oxygen by calculation as to the amount of oxygen which could be consumed by complete combustion of the hydrocarbons present is not sufficient for complete combustion and the result is that not all of the material within the drum will ignite but will smolder producing a reducing atmosphere or effluent which is rich in hydrocarbons.

The products of combustion from the primary burner 66 which are directed through the drum will cause a flow of gases downwardly through the drum which will exit at the discharge end thereof. The hydrocarbon rich effluent will pass from the lower end of the drum and will migrate by convection back toward the effluent entry ports 71 in the chamber divider wall 34. In this manner, the effluent will pass into the mixing section 68 of the combustion completion chamber 31.

The secondary burners 23 are cut back in their heat input where there is a high presence of hydrocarbon in the drying and preliminary combustion chamber because the process is designed to use the hydrocarbon in the material as they fuel for the heating process. This is also necessary to prevent the temperatures in the drying and preliminary combustion chamber from exceeding the maximum temperatures desired inasmuch as the hydrocarbon itself in the presence of the oxygen being injected through the secondary burners sustains sufficient combustion within the drying and preliminary combustion chamber required to maintain the heat level.

The hydrocarbon rich effluent, upon entering the combustion completion chamber, will be elevated in temperature therein due to the high temperature of gases present in the combustion completion chamber. The high velocity air injectors 22 will be operating at this time at a low set point injecting a low level of air to the combustion completion chamber. The effluent, upon reaching the elevated temperature and coming into contact with the oxygen present in the combustion completion chamber, will ignite and burn within the chamber. As this occurs, the temperature within the chamber will begin to increase. This is sensed by the temperature sensing probe 76 which will operate through servo controls (not shown) to further increase the quantity of air injected by the air injectors 22. Further increasing temperatures within the combustion completion chamber will be indicative of the presence of further quantities of combustible hydrocarbons which will likewise control further air injection until the temperatures stabilize within the chamber at which point the air injectors will be held at a given point to maintain the stability.

In an operating condition, temperatures in the range of 2500 degrees are achieved in the combustion completion chamber in cases wherein the material being dried is heavy with hydrocarbons. In the event that this temperature would be exceeded, appropriate servo controls are employed (not shown) to slow down the operation of the screw conveyor to limit the feed rate of hydrocarbons to the system.

The combustion completion chamber chimney operating in conjunction with the negative pressure control damper 18 and the effluent restriction discharge port 72 will stabilize the negative pressure within the combustion completion chamber 31. This negative pressure will be set so as to induce a flow of gases through the combustion completion chamber into the expansion and settling chamber at a velocity at which particulate matter within the gases may settle within the expansion and settling chamber and also maintain a low velocity which will further insure complete burning of the gases within the combustion completion chamber.

The temperature and pollution components of the gases being emitted from the combustion completion chamber chimney will be monitored. If necessary, the preheat and pilot burners may be operated at a higher input to generate further heat and consume combustibles within the combustion completion chamber as necessary.

As previously described, the dried material being discharged from the drying drum assembly will be passed into the discharge hopper 25. The discharge hopper, vibratory metering conveyor 26 and its associated discharge chute assembly 27 are all atmospherically sealed and thermally insulated to prevent oxidation of the material passing to the press feed hopper as well as cooling thereof. The material will be moved from the discharge hopper, as required, by the vibratory metering conveyor to maintain the press feed hopper full. The material will then pass hot from the press feed hopper to the press wherein it will become compacted into briquettes. The absence of any moisture or other volatiles in the briquette plus the elevated temperature of the material will provide a briquette of far greater integrety and intensity than that heretofore known.

The reducing atmosphere present in the drying and preliminary combustion chamber will, in the presence of the hot material, actually increase the carbon content in the material. Additionally, the reducing atmosphere will prevent the loss of silicon in the material as well.

Various alloying materials such as chrome, nickel and the like, as required, may be intermixed with the metallic particles to be dried in the feed hopper or at any other point along the system and placed in the drying drum assembly. This alloy material will then become mixed with the material to be dried and will be discharged into the discharge hopper thoroughly intermixed with the material. The presence of the alloy material in the resultant briquette will produce a briquette which, when remelted, will produce a melt which may contain any combination of alloy material desired.

III. Typical Installation

Hereinafter will be a description of the size, temperatures, pressures and other variables which will be encountered in a typical installation capable of producing approximately five tons per hour of dried and de-oiled material. These variables will, of course, differ substantially depending on the size of system employed and the particular installation involved.

A typical five ton per hour system would utilize a dryer assembly 10 of length of approximately 16 feet, width 8 feet and a drying and preliminary combustion chamber height of approximately 5 feet 8 inches while the combustion completion chamber would be of a height of approximately 5 feet 7 inches.

A briquetting press which may be utilized with the system is one manufactured by C-E Cast Industrial Products, Division of Combustion Engineering, Inc. and known as Model BL-500. This press produces approximately five tons of briquettes per hour which are approximately 5 inches in diameter and weigh approximately 15 pounds per briquette. The press develops approximately 500 tons piston load to compress the briquettes. Any other suitable press or compacting device may be used to produce a compressed or compacted briquette, slug or the like of high density metallic particles. The particular form and size of briquette or slug is not significant.

The drying drum assembly is 46 inches in diameter and 11 feet 4 inches in length. The screw conveyor 16 employs a 9 inch diameter screw with an initial 3 inch pitch progressing to a 12 inch pitch over an eight foot length.

The effluent entry ports 71 are approximately 2.75 inches by 4.50 inches having a total cross-sectional area combined of 2.15 square feet and are 25 in number. The effluent restriction discharge port 72 is approximately 2 feet 3 inches by 4 feet 6 inches in size.

The negative pressure range within the elongate combustion completion chamber may be varied according to the damper setting between atmospheric and 0.275 inches of water. The preferred negative pressure during operation is approximately 0.04 inches of water.

The discharge hopper 25 is designed to hold approximately one ton of material in the discharge hopper in the five ton per hour unit. This is approximately 12 minutes storage or retention for the press during normal operating conditions.

The force cooling for the drum shaft is approximately 12 gallons per minute of water passage through the drum. This flow rate may be varied depending on operating temperatures.

Set out hereinafter will be the various flow rates and temperatures expected in the system in a typical operating condition utilizing cast iron borings as the material being dried wherein the borings contain approximately 0.3 percent carbon. The assumed conditions will be cast iron borings with a 3 percent hydrocarbon by weight content of industrial cutting oil.

In the specific example, the screw conveyor will be operated at approximately 18 RPM to maintain a five ton per hour throughput. The drum speed will be operated at approximately 3.2 RPM and the material therein will have a three to five minute retention time.

The primary burner has a capability of operating between 250 CFH and 1250 CFH of natural gas and a range of between 250 CFH to 12,500 CFH of air. The secondary burners have a gas throughput range of between 100 CFH and 500 CFH of natural gas and air between 1000 CFH and 5000 CFH. In the particular example concerned, the primary burner was operated at 5000 CFH of air and 250 CFH of gas to produce approximately 500,000 BTU's/hr. while each of the four secondary burners was operated at approximately 300 CFH of gas and 3000 CFH of air to produce approximately 300,000 BTU's/hr. output each.

In the specific example, the temperature within the drying and preliminary combustion chamber was approximately 1,250 degrees Fahrenheit. The temperature of the chips upon reaching the press were approximately 950 degrees Fahrenheit.

The preheating and pilot burners 21 in the embodiment being described are capable of operating between 100 CFH and 450 CFH of gas and air throughput of 1000 CFH to 4500 CFH. The high velocity air injectors 22 are capable of being operated within a range from a minimum of 2500 CFH to 25,000 CFH. In the example involved, the preheat and pilot burners were operated at a throughput of 200 CFH of gas and 2000 CFH of air to produce a 200,000 BTU/hr. output whereas the air injectors were operated at 6,250 CFH output. The resultant temperature in the combustion completion chamber was approximately 1700 degrees Fahrenheit.

In the specific example involved, the gas flow velocity in the drying and preliminary combustion chamber is approximately one foot per second. The estimated gas velocity in the combustion and completion chamber is approximately 1.9 feet per second in the expansion and settling chamber 70.

The system of the present invention, including the methods and apparatus involved therein, has been described in respect to a particular embodiment thereof as set forth in the specification and the drawings. However, it is to be understood that no limitation as to the scope of the invention was thereby intended, the scope of the invention being determine by the following claims.

What is claimed is:

1. Apparatus for drying and preheating small metallic particles such as chips, turnings, borings and the like to remove volatiles therefrom such as moisture and combustibles such as cutting oils comprising:
    a drying and preliminary combustion chamber;
    conveyor means for conveying the particles through the drying and preliminary combustion chamber;
    heating means for heating the particles to at least a temperature at which the volatiles will be driven from the particles and the particles rendered more ductile; and
    press means for compressing the heated particles into a briquette.

2. The apparatus of claim 1 further including means for restricting the presence of oxygen from the particles at, through and between the heating means and press means.

3. The apparatus of claim 2 wherein the heating means further includes means for creating a reducing atmosphere in the region of the particles being heated to increase the carbon level therein.

4. The apparatus of claim 2 further including means for intermixing further preselected alloying particles with the metallic particles to produce an alloy mix of briquetted particles.

5. The apparatus of claim 1 wherein the press means is forced cooled to prevent temperature buildup in the press during sustained operation of the apparatus.

6. The method of drying and preheating small metallic particles such as chips, turnings, borings and the like to remove volatiles therefrom such as moisture and combustibles such as cutting oils comprising the steps of:
    passing the particles through a conveyor positioned within a stationary drying and preliminary combustion chamber;
    heating the particles to at least a temperature at which the volatiles will be driven from the particles and the particles rendered more ductile; and
    compressing the dried and preheated particles into a briquette.

7. The method of claim 6 further including the step of restricting the presence of oxygen from the particles during heating and drying thereof and compressing in the press means to prevent oxidation of the particles.

8. The method of claim 7 further including the step of maintaining a reducing atmosphere around the particles being heated to increase the carbon level thereof.

9. The method of claim 6 further including the step of intermixing further preselected alloying particles with the metallic particles prior to compressing into a briquette to produce an alloy mixing in the briquette.

10. The method of claim 6 further including the step of force cooling the press means to prevent temperature buildup therein.

11. Apparatus for drying and preheating small metallic particles such as chips, turning, borings and the like to remove volatiles therefrom such as moisture and combustibles such as cutting oils comprising:
    a drying and preliminary combustion chamber;
    conveyor means for conveying the particles through the drying and preliminary combustion chamber;
    means for heating the particles to at least a temperature at which the volatiles will be driven from the particles; and
    means for restricting the presence of oxygen in the region of the particles being heated to reduce oxidation thereof.

12. The apparatus of claim 11 further including means beyond the region of the particles being heated to complete combustion of the combustibles driven from the particles.

13. The apparatus of claim 11 wherein the means for heating the particles includes means for creating a reducing atmosphere in the region of the particles to increase the carbon level therein.

14. The apparatus of claim 11 further including means for intermixing further preselected alloying particles with the metallic particles to produce an alloy mix of preheated and dried particles.

15. The method for drying and preheating small metallic particles such as chips, turnings, borings and the like to remove volatiles therefrom such as moisture and combustibles such as cutting oils comprising the steps of:
    passing the particles through a conveyor positioned within a stationary drying and preliminary combustion chamber;
    heating the particles to at least a temperature at which the volatiles will be driven from the particles; and
    restricting the presence of oxygen from the particles in the region in which they are heated to reduce oxidation thereof.

16. The method of claim 15 further including the step of completing combustion of the combustibles driven from the particles at a point beyond the region in which the particles are being heated to reduce air pollution.

17. The method of claim 15 further including the step of creating a reducing atmosphere surrounding the particles being dried and preheated to increase the carbon level therein.

18. The method of claim 15 further including the step of intermixing further preselected alloying particles with the metallic particles during drying and preheating thereof to produce an alloy mix of preheated and dried particles.

19. Apparatus for drying and preheating small metallic particles such as chips, turnings, borings and the like to remove volatiles therefrom such as moisture and combustibles such as cutting oils comprising:

a drying and preliminary combustion chamber;
a combustion completion chamber;
conveyor means for conveying the metallic particles through the drying and preliminary combustion chamber;
feed means for delivering the metallic particles to the conveyor means;
discharge means interconnected to the drying and preliminary combustion chamber for receiving the dried and preheated particles from the conveyor means;
drying and preliminary combustion chamber burner means positioned within the drying and preliminary combustion chamber for elevating the temperature therein to a level at least at which the volatiles will be driven from the particles;
effluent passageway means interconnecting the drying and preliminary combustion chamber with the combustion completion chamber premitting passage of combustibles to the combustion completion chamber from the drying and preliminary combustion chamber;
combustion completion chamber burner and air injector means for introducing heat and air to the combustion completion chamber means to complete combustion of the combustibles therein; and
combustion completion chamber chimney means for removing the completely burned combustibles from the combustion completion chamber.

20. The apparatus of claim 19 further including means atmospherically sealing the drying and preliminary combustion chamber and combustion completion chamber to prevent uncontrolled air from entering the chambers resulting in oxidation of the metallic particles in the drying and preliminary combustion chamber.

21. The apparatus of claim 20 wherein the combustion completion chamber chimney means includes a barometric damper to control the negative pressure within the drying and preliminary combustion chamber and the combustion completion chamber.

22. The apparatus of claim 21 further including a pressure sensor in the drying and preliminary combustion chamber, a servo control motor controlled by the pressure sensor and wherein the barometric damper is a positive control damper operated by the servo control motor.

23. The apparatus of claim 20 further including temperature sensing means within the drying and preliminary combustion chamber and wherein the drying and preliminary combustion chamber burner means are variable flow rate devices under the control of the temperature sensing means to control the temperature within the drying and preliminary combustion chamber.

24. The apparatus of claim 20 wherein the drying and preliminary combustion chamber burner means are variable fuel/air ratio devices and are set for maintenance of a reducing atmosphere within the drying and preliminary combustion chamber.

25. The apparatus of claim 20 wherein the combustion completion chamber burner and air injector means include a plurality of preheater and pilot burners to preheat the combustion completion chamber and maintain combustion therein and a plurality of air injectors to supply air to the combustion completion chamber to complete burning of combustibles within the combustion completion chamber.

26. The apparatus of claim 25 further including temperature sensing means within the combustion completion chamber and wherein the preheater and pilot burners and air injectors are variable flow rate devices controlled by the temperature sensing means to maintain the temperature within the combustion completion chamber at a temperature sufficient to completely burn the combustibles therein.

27. The apparatus of claim 20 wherein the combustion completion chamber is an elongate chamber and includes a mixing section within which the combustion completion chamber burners and air injectors are positioned and an elongate expansion and settling section intermediate the mixing section and the combustion chamber chimney means within which the gas velocity therein is reduced permitting particulate matter therein to settle.

28. The apparatus of claim 27 wherein the combustion completion chamber burner and air injector means include a plurality of air injectors and wherein the air injectors are positioned within the combustion completion chamber in opposed and staggered relationship within the mixing section thereof and direct the injected air transverse to the flow of effluent within the combustion completion chamber to induce complete mixing and combustion thereof.

29. The apparatus of claim 27 wherein the combustion completion chamber includes an effluent restriction port intermediate the expansion and settling section and the combustion completion chamber chimney means to control the rate of gas flow from the combustion completion chamber.

30. The apparatus of claim 19 wherein the drying and preliminary combustion chamber and combustion completion chamber include a common chamber divider wall and wherein the effluent passageways are a plurality of effluent exit ports within the common chamber divider wall.

31. The apparatus of claim 19 wherein the conveyor means is an elongate drying drum including a central drum shaft journaled for rotation within the drying and preliminary combustion chamber.

32. The apparatus of claim 31 wherein the drying drum is inclined slightly vertically and includes a plurality of overlapping arcuate segments disposed within the inner circumference of the drum each inclined longitudinally of the drum at a reverse lead angle to the direction of drum rotation and each end of which are disposed longitudinally of the drum from one another to increase mixing of the metallic-particles and retention thereof within the drum.

33. The apparatus of claim 31 wherein the central drum shaft is force cooled.

34. The apparatus of claim 31 wherein the drying and preliminary combustion chamber burner means include a plurality of secondary burners positioned within the drying and preliminary combustion chamber longitudinally along the drying drum to maintain controlled heat along the drum.

35. The apparatus of claim 31 wherein the drying and preliminary combustion chamber burner means includes at least one primary burner positioned within the drying and preliminary combustion chamber for discharge directly into one end of the drying drum to heat the metallic particles therein and ignite the combustibles driven from the particles.

36. The apparatus of claim 19 wherein the conveyor means includes a variable speed drive means to control the output rate of metallic particles from the apparatus.

37. The apparatus of claim 19 wherein the feed means includes a feed hopper and a screw conveyor having a feed end in communication with the feed hopper and a discharge end positioned within the drying and preliminary combustion chamber and in communication with the interior of the drying drum.

38. The apparatus of claim 37 wherein the screw conveyor includes a screw feeder having an increasing lead angle in the direction of the discharge end to prevent compacting of the metallic particles within the screw conveyor.

39. The apparatus of claim 37 wherein the screw conveyor further includes a variable speed drive to control the feed rate to the conveyor means.

40. The apparatus of claim 37 wherein the feed hopper and screw conveyor are in atmospherically sealed relationship to the drying and preliminary combustion chamber to prevent introduction of oxygen to the drying and preliminary combustion chamber preventing oxidation of the metallic particles therein.

41. The apparatus of claim 19 wherein the discharge means includes a discharge hopper atmospherically sealed in relation to the drying and preliminary combustion chamber to prevent introduction of oxygen to the drying and preliminary combustion to prevent oxidation of the metallic particles therein.

42. The apparatus of claim 41 further including press means for compressing the metallic particles into briquettes, the press means including a press feed hopper in communication with the discharge hopper and atmospheric sealing means between the press feed hopper and the discharge hopper to restrict the introduction of air to the hot particles to prevent oxidation thereof prior to introduction of the particles into the press means.

43. The apparatus of claim 42 further including thermal insulating means between the press feed hopper and the discharge hopper to prevent cooling of the heated metallic particles before introduction into the press.

44. The apparatus of claim 43 further including particle metering means between the discharge hopper and the press feed hopper to control the delivery rate of metallic particles to the press means.

45. The apparatus of claim 19 wherein the drying and preliminary combustion chamber and the combustion completion chamber are each self contained chambers joined together at a common parting line and wherein the conveyor means is an elongate drum including a drum shaft journaled at one end at the parting line permitting removal of the drum upon separation of the drying and preliminary combustion chamber and the combustion completion chamber.

46. The method of drying and preheating small metallic particles such as chips, turnings, borings and the like to remove volatiles therefrom such as moisture and combustibles such as cutting oils comprising the steps of:
 passing the metallic particles through a stationary drying and preliminary combustion chamber;
 atmospherically sealing the drying and preliminary combustion chamber;
 heating the metallic particles to a temperature to volatilize the volatiles; and
 introducing only sufficient oxygen to the drying and preliminary combustion chamber to permit limited combustion of the combustibles generating a combustible effluent forming a reducing atmosphere.

47. The method of claim 46 wherein the particles are passed through an enclosed conveyor means within the drying and preliminary combustion chamber and further including the steps of:
 heating the exterior of the conveyor means with secondary burners; and
 directing the products of combustion of an oxygen rich primary burner into the enclosed conveyor means to sustain limited combustion within the conveyor means.

48. The method of claim 47 including the further steps of:
 sensing the temperature within the drying and preliminary combustion chamber; and
 throttling the secondary burners to maintain the temperature within the drying and preliminary combustion chamber within a predetermined range.

49. The method of claim 46 including the further steps of:
 passing the effluent to a combustion completion chamber;
 maintaining the combustion completion chamber at or above a combustion temperature of the effluent; and
 introducing air to the combustion completion chamber in sufficient volume to sustain and complete combustion of the effluent.

50. The method of claim 49 wherein the combustion completion chamber includes a plurality of preheater and pilot burners and a plurality of air injectors and including the further steps of:
 sensing the temperature of the combustion chamber;
 throttling the preheater and pilot burners to maintain the combustion completion chamber at a low set point sufficient to burn combustibles; and
 throttling the air injectors to introduce more air into the combustion completion chamber as the temperature thereof rises indicating the presence of additional combustible effluent.

51. The method of claim 50 wherein a combustion completion chamber chimney means is in communication with the combustion completion chamber and further including the step of:
 controlling the negative pressure within the combustion completion chamber by means of a damper positioned within the combustion completion chamber chimney means.

52. The method of claim 46 further including the steps of:
 conveying the metallic particles to a briquetting press while still hot;
 shielding the metallic particles from contact with the atmosphere while being conveyed between the drying and preliminary combustion chamber and the briquetting press; and
 compressing the hot metallic particles into a briquette.

53. The method of claim 52 further including the step of thermally insulating the metallic particles while being conveyed between the drying and preliminary combustion chamber and the briquetting press.

54. The method of claim 52 further including the step of force cooling the briquetting press to prevent heat buildup therein.

55. The method of claim 52 in which the briquetting press includes a feed hopper and further including the steps of:
 storing the hot metallic particles in a discharge hopper; and monitoring the level of metallic particles within the feed hopper of the press and selectively metering delivery of metallic particles from the discharge hopper to the press feed hopper as required.

56. The method of drying and preheating small metallic particles such as chips, turnings, borings and the like to remove volatiles therefrom such as moisture and combustibles such as cutting oils comprising the steps of:

heating the particles to at least a temperature at which the volatiles will be driven from the particles and the particles rendered more ductile;

utilizing the hydrocarbon content of the volatiles for at least partially the fuel for the process; and compressing the dried and preheated particles into a briquette.

57. Apparatus for drying and preheating small metallic particles such as chips, turnings, borings and the like to remove volatiles therefrom such as moisture and combustibles such as cutting oils comprising:

means for heating the particles to at least a temperature at which the volatiles will be driven from the particles;

means for restricting the presence of oxygen in the region of the particles being heated to reduce oxidation thereof; and utilizing the hydrocarbon content of the volatiles for at least partially the fuel for the process.

* * * * *

UNITED STATES PATENT OFFICE
CERTIFICATE OF CORRECTION

Patent No. 4,133,635              Dated January 9, 1979

Inventor(s) John R. Fellnor and William J. Love, Jr.

It is certified that error appears in the above-identified patent and that said Letters Patent are hereby corrected as shown below:

Item (73) Assignee: of the cover page delete "Combustion Engineering, Inc., Stamford, Conn." and insert --Melting Systems, Incorporated, Burlington, New Jersey Column 2 line 39 delete "dired" and insert --dried--.

Column 4 line 14 between "completion" and "of" insert --chamber--.

Column 5 line 7 between "30" and "completion" insert --and combustion--.

line 22 between "end" and "a" insert --by--.

line 23 between "Atmospheric" and "seals" insert --shaft--.

Column 6 line 51 delete "longitudinally" and insert --longitudinal--.

Colum 7 line 7 delete "well" and insert --wall--.

Column 8 line 66 delete "hopper" (2nd occurrence) insert -- upper --.

Column 10 line 32 delete "they" and insert --the--.

Column 11 line 37 delete "integrety" and insert --integrity--.

Column 13 line 23 delete "determine" and insert --determined--.

Column 14 line 9 delete "mixing" and insert --mix--.

line 14 delete "turning" and insert --turnings--.

UNITED STATES PATENT OFFICE
CERTIFICATE OF CORRECTION

Patent No. 4,133,635     Dated January 9, 1979

Inventor(s) John R. Fellnor and William J. Love, Jr.

It is certified that error appears in the above-identified patent and that said Letters Patent are hereby corrected as shown below:

Column 17 line 25 between "combustion" and "to" insert --chamber--.

*Signed and Sealed this*

*Seventh* Day of *August 1979*

[SEAL]

Attest:

LUTRELLE F. PARKER
*Attesting Officer*     *Acting Commissioner of Patents and Trademarks*